United States Patent [19]

Haas, Sr. et al.

[11] 4,391,832

[45] Jul. 5, 1983

[54] PROCESS FOR MAKING MULTI-LAYER CREAM-FILLED WAFER BLOCKS

[76] Inventors: Franz Haas, Sr., Gerstlgasse 25, A-1210 Wien; Franz Haas, Jr., Castellezgasse 32, A-1020 Wien; Johaan Haas, Wiener Strasse 209-215, A-2104 Spillern, N.Ö., all of Austria

[21] Appl. No.: 274,247

[22] Filed: Jun. 16, 1981

[30] Foreign Application Priority Data

Jun. 18, 1980 [AT] Austria .................................. 3219/80

[51] Int. Cl.³ .................... A21D 13/00; A23G 3/00
[52] U.S. Cl. .................................... 426/275; 426/274; 426/94; 426/103; 99/450.4
[58] Field of Search ................... 426/274, 94, 103, 95, 426/275, 283, 496; 99/450.1, 450.2, 443 C, 644, 450.4, 450.5, 450.7

[56] References Cited

U.S. PATENT DOCUMENTS

4,246,290  1/1981  Haas, Sr. et al. .................... 426/274

*Primary Examiner*—Jeanette M. Hunter
*Attorney, Agent, or Firm*—Schwartz, Jeffery, Schwaab, Mack, Blumenthal & Koch

[57] ABSTRACT

Cream-coated wafer sheets are conveyed by a feeder conveyor in a first plane to a stacking device. The coated wafers are raised in the stacking device into a second plane and by such a raising are attached to the lower sides of a wafer sheet already in the second plane to form a wafer block which is in a raised position with respect to the feeder conveyor. An uncoated covering wafer sheet is separately supplied to each wafer block such that the covering sheet is delivered directly into the second plane at the stacking point, and a coated sheet is attached to the lower side of this covering sheet by rising up into a position in which its cream coating contacts the lower side of the covering sheet. This separate, direct supply of the uncoated covering wafer sheet is effected by a covering sheet conveyor disposed above the feeder conveyor. The terminal end region of the covering sheet conveyor ends in the second plane at the upstream side of the stacking device.

3 Claims, 5 Drawing Figures

PROCESS FOR MAKING MULTI-LAYER CREAM-FILLED WAFER BLOCKS

BACKGROUND OF THE INVENTION

The invention relates to a process for making multi-layer cream-filled wafer blocks.

Wafer blocks are known in the food and biscuits and confectionery industry as intermediate products for mechanically produced wafer products. Among the various known wafer products are cookies and confectionary, for example, wafer cones, wafer cups, wafer plates, flat wafer discs, hollow croissants, wafer rolls, ice cream cones, filled wafers, ice cream wafers, wafer slices small cream filled wafer bars and the like. Wafer blocks are also known as a starting product for filled wafers, ice cream wafers, wafer slices small cream filled wafer bars and the like. All these wafer products are bakery products made from a wafer batter and having a crips, brittle and easily breakable consistency.

The individual kinds of wafer products differ from one another in the type of manufacture. Thus, some wafer products are baked in their final form, as may be the case, for example, with wafer cones, wafer cups, wafer discs and the like. In the case of other wafer products, a wafer sheet or an endless wafer strip is first baked; and, in a baked but still soft state, the wafer sheet or strip is shaped into its final form. In this form the wafer product cools and assumes its crisp, brittle consistency. Examples of this are ice cream cones, hollow croissants, wafer rolls and the like.

For wafer products made from wafer blocks, several wafer sheets are baked, for example, in an automatic baking machine, cooled, coated with cream and formed into a stack The cream-filled wafer block obtained in this way is then cut into small handy pieces of equal size. The resulting product then comes onto the market, packaged in units consisting of one piece or several pieces and, if appropriate, also packaged in an air-tight manner. Examples of wafer products of this type are cream wafer biscuits or cookies.

The various wafer products can be provided with coatings such as, for example, of sugar or chocolate, or can be filled, for example, with edible ice, various creams, chocolate and the like.

Wafers of the present invention may at times be referred to as "waffles", but waffles baked in a waffle iron are to be distinguished from the above-described wafer products. The waffle iron product is a soft baked product analogous to a bread roll or pancake and, therefore, has no similarity at all in its consistency and usability to the above-described wafer products.

The invention, in particular, relates to a process for making multi-layer cream-filled wafer blocks, in which process cream-coated wafer sheets are conveyed in a first plane to a stacking point, where they are raised into a second plane and attached from below to the already raised part of the wafer block. Each coated wafer sheet is first pushed under that part of the wafer block which is held in the raised position, and then is raised. The wafer block thus formed is removed in the raised position from the stacking point.

In a certain process of this type, the wafer sheets are conveyed in succession to the stacking point on a single conveyor belt. On this conveyor belt, those wafer sheets which are to be provided with cream are coated by the contact coating process, the wafer sheets being conveyed away, spaced from one another, under a coating head located above the conveyor belt. When a wafer sheet is to remain uncoated, the conveyor belt is lowered, and the wafer sheet runs through under the coating head without contact therewith and is brought uncoated to the stacking point. Cream-filled wafer blocks can be made in this way if the cream can be applied to the wafer sheets by the contact coating process, since it is possible, in the contact coating process, to convey coated and uncoated wafer sheets on the same conveyor belt.

There are, however, creams which, because of their consistency, can only be applied to the wafer sheets by the film application process, or it is desirable for other reasons to apply the cream by the film application process. This may be the case, for example, when a further layer of cream is to be applied to a first layer of cream. In the film application process, the wafer sheets lying adjacent to one another on a conveyor belt are coated with cream by a film of cream being drawn off continuously from a roller by means of a blade and deposited onto the wafer sheets which are guided past underneath the roller by the conveyor belt. A belt located behind the conveyor belt and running at a higher speed separates the coated wafer sheets lying adjacent to one another, so that a sufficiently large distance arises between the wafer sheets to permit subsequent stacking. This belt, which runs at a substantially higher speed than the conveyor belt conveying the wafer sheets lying adjacent to one another under the cream application device, delivers the individual wafer sheets at intervals to a stacking device.

In the case of wafer sheets coated by the film application process, it is necessary either to deliver the covering sheet separately or to keep a wafer sheet free of cream by other measures.

There is also a process in which each wafer sheet is first raised in the stacking device and, as soon as the next wafer sheet is in position under the raised wafer sheet, the raised wafer sheet is allowed to drop onto it. In this process, although each wafer sheet is raised to form the stack, the raised wafer sheets are lowered onto the coated wafer sheet lying underneath, and the wafer sheets combined in this way are then raised again. The covering sheet is then deposited from its own conveyor belt onto the already assembled wafer block. Since the descent of the already raised wafer sheets before the next raising of the stack represents an additional process step, requiring a certain period of time, the efficiency of this process is limited.

In another apparatus for making cream filled wafer blocks by means of a single cream application device, the wafer sheets are coated with cream by the contact coating process on a feed belt before entry into a stacking device. They are then subsequently introduced into a vertical conveyor which consists of two screw tracks rotating about vertical axes. Uncoated wafer sheets are obtained by lowering the feed belt, since there is then no contact between the cream application device and the wafer sheet. However, this is not possible in the film application process, since the film is, of course, not interrupted by lowering the feed belt. Consequently, such apparatus cannot be used for making wafer blocks consisting of wafer sheets coated by the film application process.

SUMMARY OF THE INVENTION

The object of the invention is, therefore, to provide a process and apparatus, permitting the formation of blocks and unobstructed discharge of the complete wafer block even at the highest working speeds and even in the case of wafer sheets coated by means of a film.

In the process according to the invention, this is achieved by virtue of the fact that the covering sheet of the wafer block is delivered to the stacking point separately from the coated wafer sheets. Specifically, the covering sheet is directly deposited in a second plane which is in the stacking location in which the first coated wafer sheet is attached from below to the covering sheet. The apparatus for carrying out the process according to the invention includes a feed belt for the coated wafer sheets and a take-off belt which is provided, if appropriate, with a calibrating roller for the wafer block. Between the feed belt and the take-off belt is a vertical stacking device which raises the coated wafer sheets from a first plane into the second plane. The vertical stacking device has two screw tracks, i.e., helical tracks, lying opposite one another. These screw tracks are arranged as an extension of the feed belt and rotate in opposite directions about vertical axes. A movable stop is located in the direction of transport immediately behind the screw tracks. There is a conveyor device for the covering sheet, which conveyor device ends in the second plane before the screw tracks. This covering sheet conveyor is located above the feed belt.

By means of the process according to the invention and the apparatus for carrying this out, a very precise and rapid formation of a wafer block from wafer sheets coated by the film application process is made possible while as gentle a treatment as possible for the individual wafer sheets is attained. At the same time, one step of the process, namely the raising of the covering sheet, is saved, in comparison with the other process for wafer sheets coated by the contact coating process. This is accomplished by supplying the covering sheet in the second plane during the stacking of the wafer sheets. A greater efficiency results from this.

In other words, the process of the invention comprises the steps of: conveying, with a feeder conveyor, cream-coated wafer sheets in a first plane to a stacking point, the coated sheets having upper and lower sides with the cream coating being on the upper side, the coated sheets for any one wafer block including at least a first coated wafer sheet which is conveyed to the stacking point prior to any other coated wafer sheet; thereafter raising the coated wafer sheet into a second plane which is above the first plane and, by such raising, attaching the coated wafer sheet to the lower side of a wafer sheet in the second plane to form a wafer block which is in a raised position with respect to the feeder conveyor, the attaching being effected by the contact of the cream coating of the wafer sheet being raised with the lower side of an immediately adjoining sheet in the second plane. The process also includes the steps of thereafter removing the wafer block from the stacking point; and separately supplying, prior to the removing step, an uncoated covering wafer sheet for each wafer block, each covering sheet having an upper and lower side, the supplying being carried out such that the covering wafer sheet is delivered directly into the second plane at the stacking point and the first coated sheet is attached to the lower side of the covering sheet by raising of the first coated sheet into a position in which its cream coating contacts the lower side of the covering sheet which has been delivered into the second plane.

A further feature of the invention provides that the covering sheet is supplied in the second plane simultaneously with the first coated wafer sheet of the wafer block, the latter being supplied in the first plane. This measure ensures the saving of a further process step, in comparison with the other process, and, consequently, a further increase in efficiency.

In preferred apparatus for carrying out the process according to the invention, the conveyor device includes a chute which can be blocked by means of a movable barrier or the like. Here, it is advantageous for one wafer sheet in the chute to be always prevented by means of the barrier from sliding further so that, when a new wafer block is being formed, the barrier needs to be removed from the chute only briefly. This enables an uncoated wafer sheet to slide onto the vertical feeders (i.e., screw tracks or helical tracks) of the stacking device to detain the next wafer sheet sliding along in the chute. This design provides a particularly simple construction of the apparatus, in which the stacking device requires no special devices at all for the uncoated wafer sheet.

In other words, the apparatus of the invention comprises a feeder conveyor for moving cream-coated wafer sheets in a downstream direction in a first plane and a stacking device disposed adjacent to and generally downstream of the feeder conveyor for receiving cream-coated wafer sheets from the feeder conveyor and for stacking the wafer sheets vertically one under the other to form a wafer block, the stacking device having an upstream and downstream side. There is also a run-off conveyor disposed downstream of the stacking device for receiving completed wafer blocks discharged from the stacking device and for transporting such wafer blocks away from the stacking device. The stacking device includes means for: vertically lifting a cream-coated wafer sheet received from the feeder conveyor above the feeder conveyor and into a second plane which is above the first plane and for attaching the lifted cream-coated wafer sheet to the lower side of a wafer sheet in the second plane to form a wafer block which is in a raised position with respect to the feeder conveyor, the attaching being effected by the contact of the cream coating of the wafer sheet being raised with the lower side of an immediately adjoining sheet in the second plane. The apparaus also includes means for controlling discharge of the completed blocks from the stacking device and means for separately supplying an uncoated wafer sheet for each wafer block by delivering the covering sheet directly into the stacking device in the second plane so that a cream-coated wafer sheet is attached to the lower side of the covering sheet by raising of the coated sheet into a position in which its cream coating contacts the lower side of the covering sheet. This separate supplying means includes a covering sheet conveyor for conveying the uncoated covering wafer sheet in a downstream direction. The covering sheet conveyor has a terminal end region, the covering sheet conveyor being disposed above the feeder conveyor with its terminal end region ending in the second plane at the upstream side of the stacking device.

The stacking device includes a pair of vertical feeders for engaging and vertically raising the wafer sheets to effect stacking thereof, these vertical feeders comprising rotatable helical tracks (i.e., screw tracks) in the form of coiled, rod-like elements, the helical tracks providing an upward spiral movement, the helical tracks having axes of rotation. There is also means for rotatably driving the helical tracks in opposite rotary directions relative to one another.

Moreover, a further feature of the invention provides that the barrier is formed by a row of bristles, and a guide plate extending up to the row of bristles, is located in fronyt of (i.e., upstream of) the barrier above the chute. This makes it possible to gently stop the wafer sheets which slide along. Thus, damage to the end edges by the stop is prevented.

Furthermore, according to the invention, the barrier may be embodied by a row of bristles. This barrier passes through the chute from below (i.e., from the lower side to the upper side), and the guide plate located above is at the shortest distance from the chute in the region of the row of bristles. In other words, the guide plate is spaced from the chute such that the distance between the guide plate and the chute is different at different points along the chute. This distance is the shortest in the region of the row of bristles.

It is thus possible for the covering sheet to pass partially between the guide plate and the row of bristles and, consequently, to be braked slowly.

Furthermore, the invention provides that at least the terminal end region of the chute is arranged parallel to the second plane defined by the screw tracks. As a result, an especially gentle delivery for the covering sheet is obtained.

The movable barrier may be formed by a plate which is mounted for pivoting movement about an axis parallel to the chute. The plate rests in the chute and is movable off from the chute.

It is further provided, according to the invention, that the stop, which is located immediately behind the screw tracks in the direction of transport, is arranged so that it can be displaced at right angles to the second plane formed by the screw tracks. In this case, it is advantageous that the part of the wafer block which has already been raised into the second plane rests against the stop over its entire height and, when a new wafer sheet is attached, slides along the stop by means of a side face.

The stop is part of a discharge controlling means disposed immediately downstream of the stacking device to provide a stop for each wafer sheet to prevent discharge thereof from the stacking device during stacking. This stop also provides an end guide for aligning the wafer sheets during stacking, the stop being vertically movable between an upper discharge blocking position above the run-off conveyor in which the wafer sheets in the stacking device engage the stop, a lower discharge position below the second plane in which the wafer sheets in the stacking device do not engage the stop and in which the completed wafer block is free to move downstream, and an intermediate vertical position above the second plane and below the main conveying surface of the run-off conveyor in which intermediate position the stop blocks downstream movement of the covering sheet in the stacking device. The discharge controlling means also includes a light gate disposed upstream of the stacking device for sensing the position of a wafer sheet, the light gate being operatively coupled with the stop for initiating lowering thereof, the light gate also being operatively coupled with the driving means for the helical tracks. The displacement of the stop is at right angles to the second plane.

The apparatus according to the invention is also distinguished by an extremely small space requirement. Thus, the length of a line of equipment for the production of wafer slices can be reduced considerably. In an apparatus according to the invention, the wafer sheets can also, if necessary, be coated with cream by the contact coating process without the advantages of the process according to the invention being lost as a result.

BRIEF DESCRIPTION OF THE DRAWING

The invention is described in more detail below with reference to an exemplary embodiment illustrated in the drawings for carrying out the process according to the invention.

DETAILED DESCRIPTION

Figure 1:
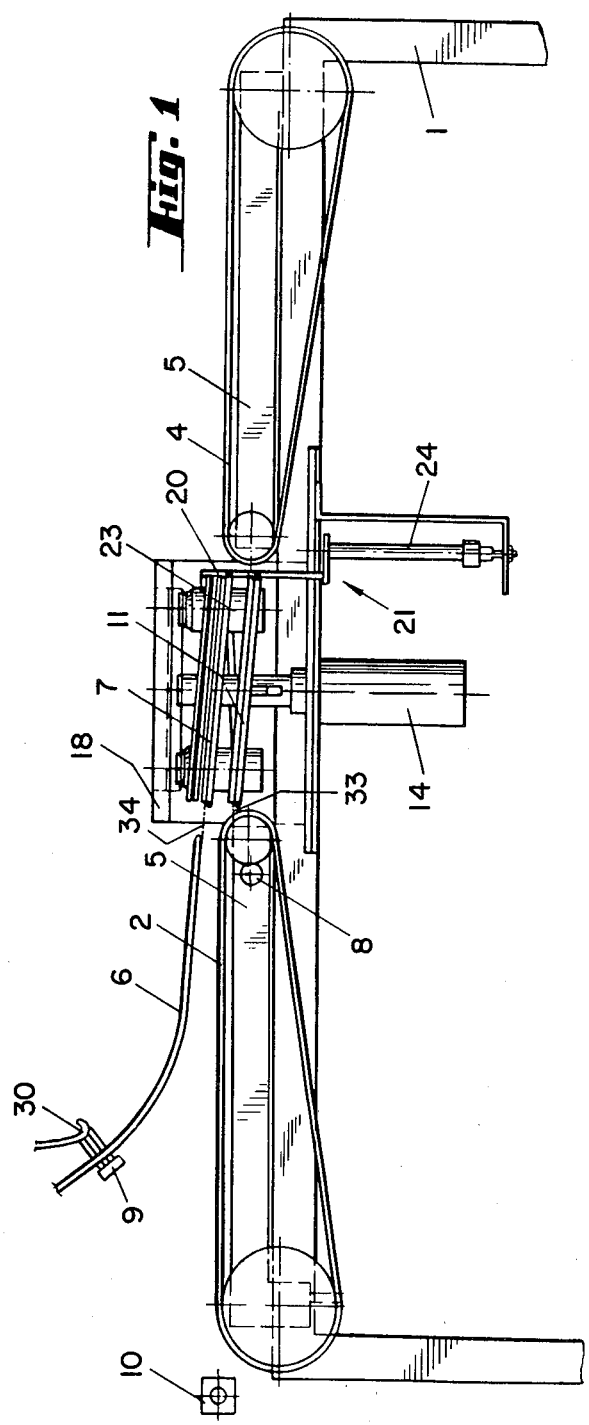
FIG. 1 shows a section through the apparatus according to the invention along the line I—I of FIG. 2.
Figure 2:
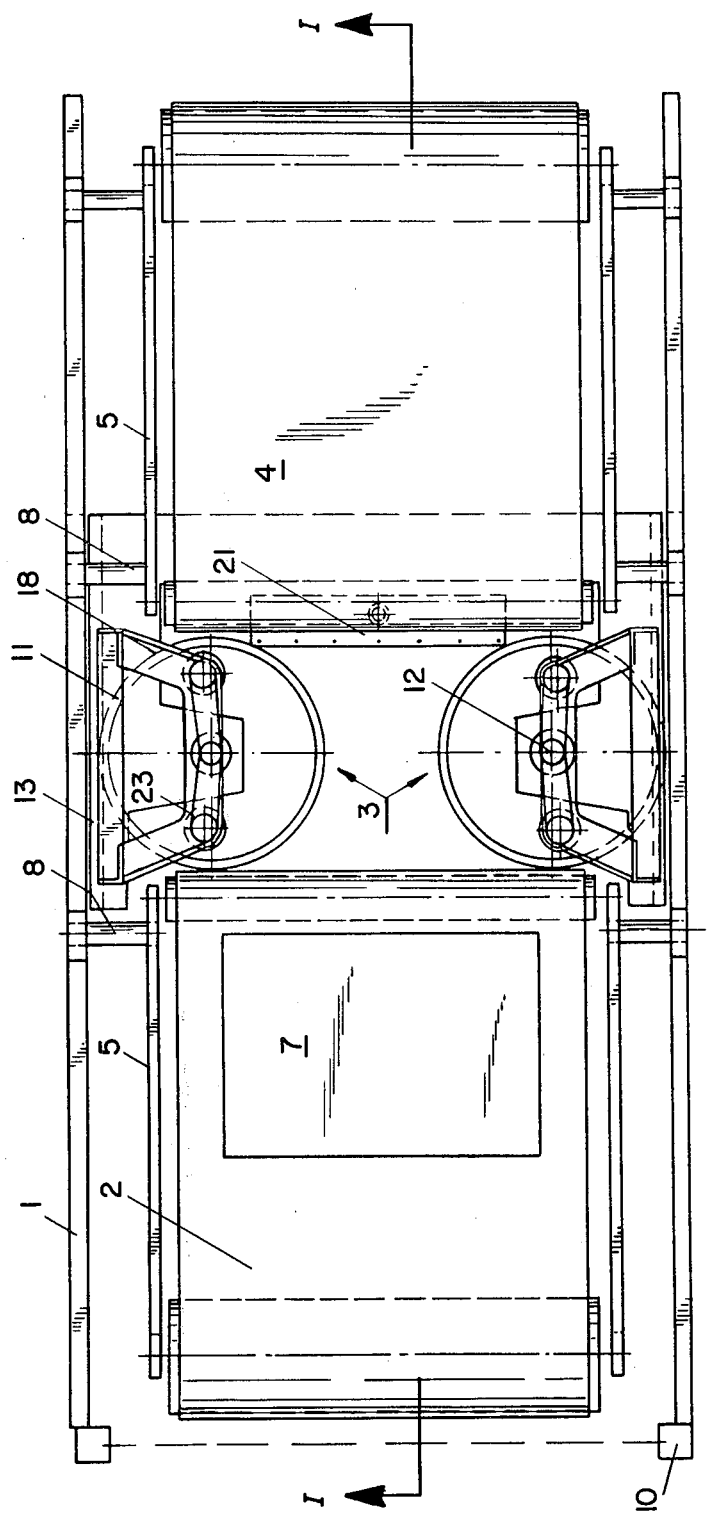
FIG. 2 shows a plan view of the apparatus according to FIG. 1.
Figure 3:
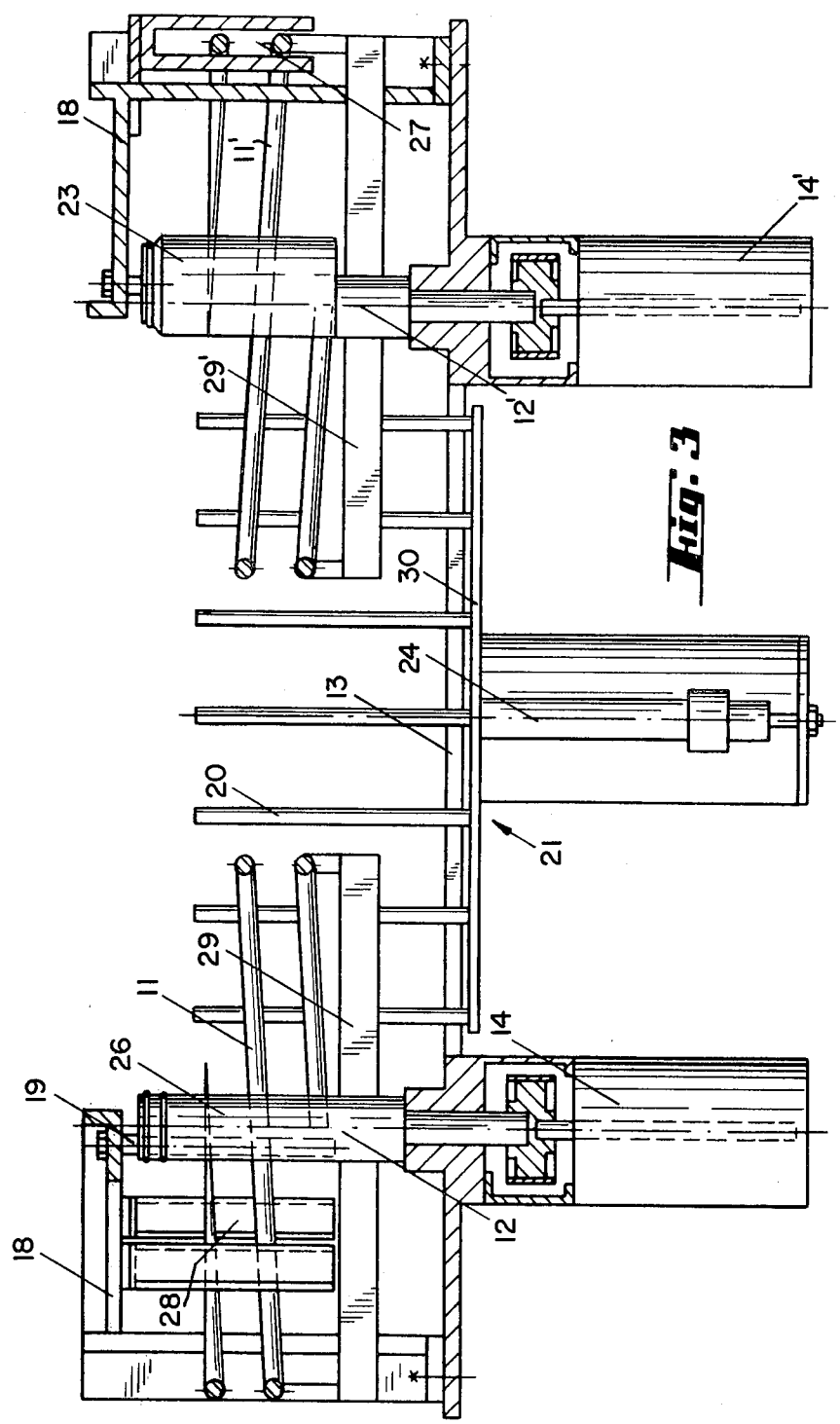
FIG. 3 shows a section through the stacking device along the line III—III of FIG. 4.
Figure 4:
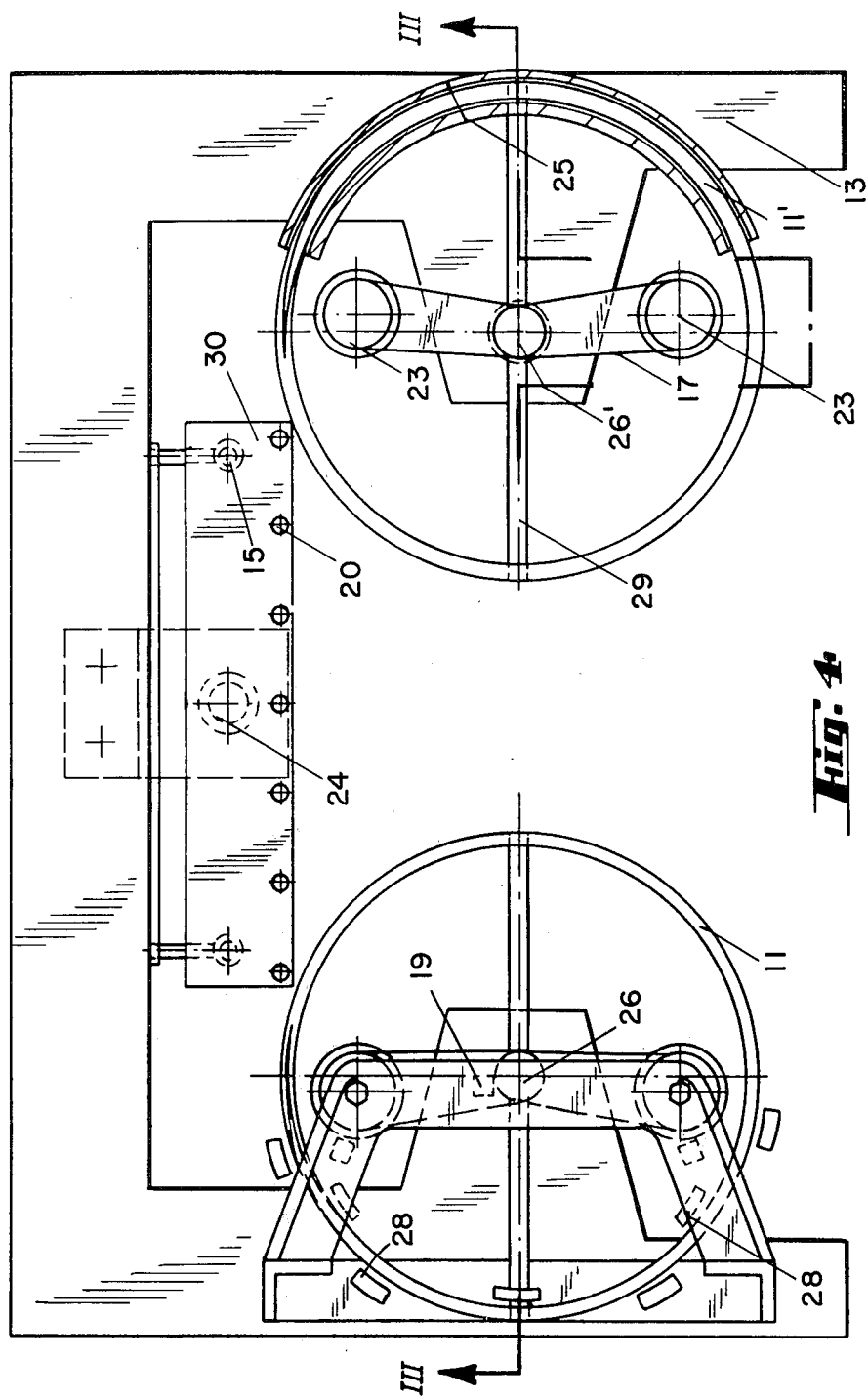
FIG. 4 shows a plan view of the stacking device according to FIG. 3.
Figure 5:
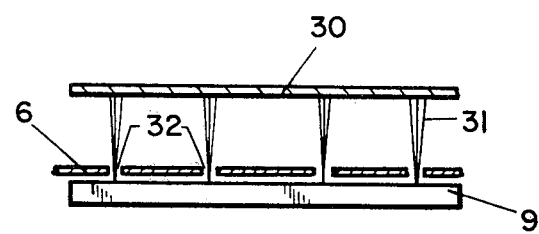
FIG. 5 shows a detail of the chute on an enlarged scale.

The apparatus according to the invention consists of a stand 1, in which a feed belt (i.e., a feeder conveyor) 2, a stacking device 3 and a take-off belt (i.e., a run-off conveyor) 4 are located. The two belts 2, 4 each have a frame 5, by means of which they are mounted on the stand 1. A chute 6 for the uncoated wafer covering sheets is mounted above the feed belt 2. If appropriate, a calibrating roller (not shown) for the wafer block is mounted above the take-off belt 4. The chute 6 ends above the feed belt immediately in front of (i.e., upstream of) the stacking device 3. Located above the chute 6 is a barrier 9 which can pivot about a horizontal axis and which can be raised from the chute or lowered towards the chute 6. Barrier 9 prevents a covering sheet lying on the chute from sliding further. The barrier may also be formed by a row of bristles 31 which can be removed from the sliding path of the wafer sheet and which can be raised from the chute at right angles thereto or lowered towards it. The chute 6 is inclined relative to the horizontal conveying plane of the feed belt 2 in such a way that, when the barrier or the stop is removed, the wafer sheet lying on the slide 6 slides along the chute 6 into the stacking device 3 as a result of gravity alone.

The base of the chute 6 may be provided with longitudinal slits 32, so that the covering sheet slides only on the webs remaining between the longitudinal slits. The barrier 9 in the form of a row of bristles can be located underneath the chute, so that the bristles pass through the base of the chute from below by way of the longitudinal slits. In the raised state, the bristles stand against a guide plate 30 located above the chute 6. The guide plate 30 is inclined towards the chute 6 and is provided, in the region of the row of bristles, with a curvature leading away from the chute 6, so that the distance between the guide plate 30 and chute 6 is shortest in the region of the row of bristles.

A covering sheet sliding along the chute 6 to the barrier 9 is detained very gently due to the formation of the barrier 9 as a row of bristles. This is because the covering sheet passes partially through between the guide plate 30 and the row of bristles and, in so doing, is braked. If the row of bristles is arranged above the chute 9 so that it can be raised relative to the latter, then the covering sheet is detained by being held between the base of the chute 6 and the row of bristles.

The release of the uncoated covering sheet by, for example, lowering the row of bristles, is controlled via a light barrier 10 located in front of the feed belt 2 and via an adjustable counter on which the number of wafer sheets of a wafer block can be set.

A cream application device (not shown) is located in front of the feed belt 2, in the direction of transport, above a conveyor belt (not shown) which conveys under the cream application device the wafer sheets which are to be coated and which lie adjacent to one another. In the region of the light barrier 10, the foregoing conveyor belt transfers the coated wafer sheets lying adjacent to one another to the feed belt 2 which runs at a substantially higher speed. As a result of this, the coated wafer sheets are separated from one another and are delivered to the stacking device 3 singly and spaced from one another. Because of the difference in the speed of conveyance of the coated wafer sheets which are conveyed lying adjacent to one another, on the one hand, and the speed of conveyance in the stacking device 3, on the other hand, the period of time necessary for the stacking operation itself is obtained.

The stacking device 3 consists of two screw tracks (i.e., helical tracks) 11, 11' which adjoin the feed belt 2 in the direction of transport and lie opposite one another and which can rotate about vertical axes and receive the wafer sheets between one another. The screw tracks 11, 11' consist of wire-shaped spring steel bent along a helix, the screw tracks 11, 11' rotating in opposite directions and being coiled in a sense opposite to their direction of rotation. In the screw track 11' on the right, looking in the direction of transport, the turns ascend in a counter-clockwise direction, and the screw track 11' rotates about its vertical axis 12' in a clockwise direction. In the opposite screw track, i.e., screw track 11 on the left, the turns ascend in a clockwise direction. The left screw track 11 rotates in a counter-clockwise direction about an axis 12 parallel to the axis of rotation 12' of the right screw track 11'. The distance of the screw tracks 11, 11' from the respective axes of rotation 12, 12' corresponds approximately to half the length of a wafer sheet 7, looking in the direction of transport. Each of the two screw tracks 11, 11' has only two turns and is fastened, by means of a diametrical arm 29, 29' to a shaft 26, 26' forming the axis of rotation 12, 12'. The arm 29, 29', as well as half to one turn of each screw track 11, 11', is located underneath the transport plane of the feed belt 2. When the screw tracks 11, 11' are stopped, the points where the two screw tracks 11, 11' first intersect the transport plane of the feed belt 2 are located outside the actual stacking region and substantially in the plane perpendicular to the transport direction and defined by the axes of rotation 12, 12' of the screw tracks 11, 11'. The distance between the axes of rotation 12, 12' of the two screw tracks 11, 11' corresponds to the width of one wafer sheet 7, increased by the diameter of one shaft 26. Under these conditions, an optimum support for the friable and easily breakable wafer sheet 7 is achieved.

The shafts 26, 26' of the screw tracks 11, 11' are mounted, at their respective lower ends, in a plate 13, fastened to the stand 1 of the apparatus. Each of the shafts 26, 26' is driven intermittently by its own motor 14, 14', so that the screw tracks 11, 11' perform only one revolution each time. The control of the motors 14, 14' and the design of the control are such that each of the screw tracks 11, 11' always stops in one and the same position after one revolution. It is ensured, in this way, that the wafer sheets do not butt against screw tracks 11, 11', but enter between them. As a result of driving the screw tracks 11, 11' with their own motors 14, 14' respectively, the space above or below the stacking device is kept free, so that any wafer blocks in which defective wafer sheets have been processed may be removed from the apparatus in a simple way by striking the wafer block with the edge of the hand between the screw tracks 11, 11', so that the wafer block breaks and falls down out of the stacking device. It is necessary, for this purpose, that the pitch of the screw tracks 11, 11' correspond to 2.5–4 times the thickness of the wire-shaped spring steel constituting the screw tracks 11, 11'. In this way, the fragments of the wafer block do not become jammed between the turns of the screw tracks. For the same reasons, the width of the wire-shaped spring steel constituting the screw tracks 11, 11' should also amount only to between one-hundredth and one-twentieth of the mean diameter of the screw tracks 11, 11'. Also, the effective part of the screw tracks 11, 11', that is to say, that part which projects above the transport plane of the feed belt 2, should consist of only one to one and a half turns. The upper end of the screw tracks 11, 11' is flattened.

To give the screw tracks 11, 11' more support, they are provided, on their parts located outside the actual stacking region, with one or more guides. These may include either of (1) an arcuate slit 27 between walls 25 opposite one another, or (2) several bars 28 or rotatably mounted rollers located alternately on the inside and on the outside of the screw tracks. The wall parts 25 delimiting the slit 27, and the bars 28 or rollers can appropriately be applied, separately from one another, against the screw tracks 11, 11'. The motors 14, 14' of the screw tracks 11, 11' are switched on by means of the same light barrier 10 which also controls the release of the uncoated wafer covering sheet on the chute 6.

The wafer sheets entering from the feed belt 2 between the turns of the screw tracks 11, 11' are conveyed up from a first plane 33, into which they are conveyed from the feed belt, into a second plane 34, from which the finished wafer block is discharged by means of the screw tracks 11, 11'. The screw tracks 11, 11' rotate in opposite directions and their turns raise the respective wafer sheets lying on the two screw tracks 11, 11' synchronously from the first plane into the second plane. During this process, certain components of forces which are transmitted to the wafer sheet as a result of the rotation of the screw tracks 11, 11' (i.e., forward components which points in the direction of transport) would tend to impart a forward movement of the wafer sheet in the direction of transport. To prevent this forward movement of the individual wafer sheets before the wafer block is finished, there is located immediately behind (i.e., downstream of) the screw tracks 11, 11' a stop 21 which consists of several fingers 20 fastened in a plate 30 and along which the wafer sheets 7 slide during the time that they are conveyed up by the screw tracks 11, 11'. Thus, the rotating screw tracks will slide relative to the wafers when the stop is in a blocking position. When the desired number of wafer sheets, which number has been set on the counter, has advanced into the stacking device 3, that is to say, when the last wafer sheet is still located in the first plane of the stacking device 3, then, when the first coated wafer sheet of the next block passes the light barrier 10, the first rotation of the screw tracks 11, 11' is triggered. As a result of this, the last wafer sheet of the block previously formed is attached to the latter from below. After this first revolution has been completed, the stop 21 descends. At the same time, the second revolution of the screw tracks 11, 11' is started without interruption.

As a result, the wafer block is released and is transferred from the screw tracks 11, 11' onto the take-off belt 4, during which time the stop 21 returns to its first position in which it remains with its top edge below the transport plane (i.e., the main conveyor surface) of the take-off belt 4. As soon as the screw tracks 11, 11' come to a standstill after the second revolution, the covering sheet in the chute 6 is released and slips onto the screw tracks 11, 11' and, therefore, into the second plane 34. At the same time, the first coated wafer sheet is pushed from the feed belt 2 into the first plane of the screw tracks 11, 11'. When the second coated wafer sheet passes the light barrier 10, the stop 21 moves into its upper, second position, and the first coated wafer sheet is applied from below to the covering sheet by the screw tracks 11, 11'.

The return of the stop 21 to its initial position in two steps is necessary because, when the finished wafer block is conveyed out of the stacking device 3 by means of the forward force component imparted by the screw tracks 11, 11', the wafer block is not moved beyond the region of the stop 21 by the screw tracks. It is only conveyed further by the take-off belt. Thus, if the stop were to return to its initial position immediately, the result would be that the tips of the fingers 20 of the stop 21 would slide along the bottommost wafer sheet of the wafer block to be discharged and would, in so doing, damage this wafer sheet.

The wafer block is pushed out by means of the screw tracks 11, 11' themselves by means of the auxiliary devices located in the interior of the screw tracks 11, 11' and by means of the take-off belt 4. The auxiliary devices comprise guide rollers 23 which grasp the wafer sheets or the wafer block at the edges parallel to the conveying direction of the belts 2 and 4. The shafts 26, 26' carrying the screw tracks 11, 11' are likewise formed as guide rollers. In this way, it is ensured that the finished wafer block has already left the stacking device 3 before the covering sheet of the next wafer block is introduced into the second plane of the stacking device.

The stop 21 is actuated by means of a compressed air cylinder 24 which engages on the plate 30 and which is likewise controlled by the light barrier 10 and the counter.

The guide rollers 23 are driven from the shaft 26 of the screw track 11 via V-belts or round belts 17. The guide rollers 23 of the auxiliary device are at a standstill when the wafer sheets are introduced. These guide rollers also have the function of ensuring that the individual wafer sheets are exactly aligned relative to one another and have the function of assisting the stacking device 3 when the wafer block is discharged from the latter. However, it is possible to have a drive of the guide rollers 23, which is independent of the drive of the screw tracks 11, 11'. With such a drive, the guide rollers can assist the feed belt 2 when the wafer sheet 7 is introduced into the stacking device 3.

The axles of the guide rollers 23 are mounted at their upper end in a gallows-like bracket 18. A stripper 19 is assigned to each of the guide rollers 23 and to the shaft 26 carrying the screw track 11 to prevent cream issuing from the sides of the wafer block from adhering to the guide roller 23 or to the shaft 26. The screw tracks 11, 11' themselves require no strippers, since they clean themselves automatically as a result of the relative movement with respect to the wafer sheets. The two guide rollers 23 can also constitute direction-changing rollers for a conveyor belt which fulfills the same functions.

According to a further alternative version of the invention, there can be provided a fixed second stop parallel to the movable stop.

This second stop projects above the second plane, but its top edge does not project above the transport plane of the drive belt 4. This second stop projects somewhat, with respect to the movable stop, towards the stacking device 3. When the movable stop is lowered below the transport plane of the take-off belt 4 in order to discharge a finished wafer block from the stacking device 3 and after the last coated wafer sheet has been attached to this wafer block, then, during the time that the finished wafer block is conveyed out of the stacking device 3, the covering sheet of the next wafer block and at the same time its first coated wafer sheet come to rest against the fixed stop. This is so that the movable stop can return to its upper end position without, in so doing, touching the end edges of the first two wafer sheets of the next wafer block, which are already located in the stacking device 3. When the first coated wafer sheet of the next wafer block is raised by means of the stacking device 3 out of the first plane into the second plane and is thereby applied from below to the covering sheet already located in the second plane, the two wafer sheets slide along the fixed stop and only come to rest against the movable stop just below the transport plane of the take-off belt. The wafer sheets then slide further up along this movable stop while further coated wafer sheets are attached.

The mode of operation of apparatus according to the invention is described in more detail below with reference to the formation of a five-layer wafer block.

The coated wafer sheets are conveyed by a conveyor device (not shown), for example, a conveyor belt of the cream application device, to the light barrier 10. The uncoated covering sheets arrive, via the chute 6, in front of the barrier 9.

As soon as the first coated wafer sheet of the new wafer block to be made has passed the light barrier 10 and is transferred to the feed belt 2, a signal is triggered at the light barrier 10. This causes, by means of a control which, if necessary, works with a time delay, a lowering of the barrier 9 from the chute 6. This further causes a consequent release of a covering sheet and the immediate switching on of the drives of the screw tracks 11, 11'.

The latter perform one complete revolution, by means of which the last coated wafer sheet of the preceding wafer block is raised and is applied from below to the other wafer sheets which are already joined to one another. After the screw tracks 11, 11' have performed the one complete revolution, the stop 21 is lowered into its bottommost position, and the drives of the screw tracks 11, 11' rotate the tracks further through a second complete revolution. As a result, the preceding finished wafer block is pushed by means of the guide rollers 23 onto the constantly running take-off belt 4 and is conveyed by the latter out of the region of the screw tracks 11, 11'.

In the meantime, the stop 21 ascends one step. After the second complete revolution of the screw tracks 11, 11', their drives are switched off. Only then is the first coated wafer sheet of the new wafer block pushed by the feed belt 2 into the lower turn of the two screw tracks 11, 11' which has become free. At the same time, with the screw tracks 11, 11' at a standstill, the covering sheet released by the barrier 9 passes via the chute 6 into the upper turn of the two screw tracks 11, 11' and comes to rest against the stop 21.

After the preceding wafer block has been discharged by the take-off belt 4 and the stop 21 has been raised into its upper end position, and when the second coated wafer sheet of the new wafer block to be made passes the light barrier 10, the screw tracks 11, 11' are made to rotate again. As a result of this, the first coated wafer sheet of the new wafer block is raised and attached to the covering sheet. After the screw tracks 11, 11' have been stopped, the second coated wafer sheet of the wafer block enters the lower turns of the screw tracks 11, 11'. The second coated wafer sheet is raised as soon as the third coated wafer sheet passes the light barrier 10. The latter wafer sheet is attached to that part of the wafer block to be made which is already in the raised position when the fourth and last coated wafer sheet of the wafer block having five wafer sheets passes the light barrier 10. This last wafer sheet enters the lower turns of the screw tracks 11, 11' after the latter have been stopped, and therefore after the third coated wafer sheet has been attached. As already described, this last wafer sheet is raised when the first coated wafer sheet of the next wafer block passes in front of the screw tracks 11, 11'.

What is claimed is:

1. A process for making multi-layer, filled wafer blocks having layers of wafer sheets, each wafer sheet having an upper and lower side, the process comprising the steps of:
    (a) applying a coating to the upper side of a first wafer sheet to form a first coated wafer sheet;
    (b) conveying, with a feeder conveyor, the first coated wafer sheet in a first plane to a stacking point at which stacking point the first wafer sheet is to be raised into a second plane which is above the first plane;
    (c) separately supplying, simultaneously with said conveying step, an uncoated covering wafer sheet for each wafer block, said supplying being carried out such that the covering wafer sheet is delivered directly into said second plane at the stacking point without being transported along the feeder conveyor;
    (d) thereafter raising the first coated wafer sheet into the second plane and, by such raising, attaching the first coated wafer sheet to the lower side of the uncoated covering wafer sheet already in the second plane to form a stack of two wafer sheets, which stack is in a raised position with respect to the feeder conveyor, said attaching being effected by the contact of the coating of the first coated wafer sheet with the lower side of the uncoated covering sheet in the second plane;
    (e) forming a completed stack of wafer sheets constituting a completed wafer block by, if one or more additional layers are desired, applying a coating to an additional wafer sheet to form an additional coated wafer sheet; conveying, with the feeder conveyor, the additional wafer sheet in the first plane to the stacking point; thereafter raising the additional coated wafer sheet into the second plane and by such raising; attaching the additional coated wafer sheet to the lower side of a wafer sheet at the bottom of the stack of wafer sheets in the second plane, and repeating said steps of applying a coating to an an additional wafer sheet, conveying the additional coated wafer sheet, raising the additional coated wafer sheet, and attaching the additional coated wafer sheet, n minus 3 times, where n is the number of sheets in the final stack; and
    (f) thereafter removing the completed wafer block from the stacking point.

2. A process according to claim 1, wherein said steps of raising the first and the additional coated wafer sheets into the second plane are performed by engaging each sheet both with a rotating helical number and also with an abutment, the rotating helical member providing an upward spiral motion, the abutment providing a stop for each sheet to prevent discharge of each sheet from the rotating helical member during raising of the sheets, the upward spiral movement effecting the raising of the sheets.

3. A process according to claim 1, wherein said step of separately supplying said uncoated covering sheet is carried out with a covering sheet conveyor disposed above the feeder conveyor and having a terminal end region in the second plane at the stacking point, the step of separately supplying the uncoated covering sheet being performed by conveying the uncoated covering sheet above the first plane with the covering sheet conveyor to the second plane at the stacking point.

* * * * *